US010961984B2

United States Patent
Vad

(10) Patent No.: US 10,961,984 B2
(45) Date of Patent: Mar. 30, 2021

(54) WIND DATA DETECTING SYSTEM AND METHOD FOR WIND TURBINES

(71) Applicant: SIEMENS GAMESA RENEWABLE ENERGY A/S, Brande (DK)

(72) Inventor: Claus Vad, Braedstrup (DK)

(73) Assignee: SIEMENS GAMESA RENEWABLE ENERGY A/S

(*) Notice: Subject to any disclaimer, the term of this patent is extended or adjusted under 35 U.S.C. 154(b) by 0 days.

(21) Appl. No.: 16/342,567

(22) PCT Filed: Sep. 13, 2017

(86) PCT No.: PCT/EP2017/072951
§ 371 (c)(1),
(2) Date: Apr. 17, 2019

(87) PCT Pub. No.: WO2018/072929
PCT Pub. Date: Apr. 26, 2018

(65) Prior Publication Data
US 2020/0208613 A1    Jul. 2, 2020

(30) Foreign Application Priority Data
Oct. 20, 2016   (DE) ................. 10 2016 220 640.0

(51) Int. Cl.
*F03B 13/00* (2006.01)
*H02P 9/04* (2006.01)
(Continued)

(52) U.S. Cl.
CPC ............ *F03D 17/00* (2016.05); *F03D 7/0204* (2013.01); *F03D 7/0224* (2013.01); *F03D 7/048* (2013.01);
(Continued)

(58) Field of Classification Search
CPC ....... F03D 17/00; F03D 7/0204; F03D 7/0224; F03D 7/048; F05B 2270/32; F05B 2270/321; F05B 2270/329
See application file for complete search history.

(56) References Cited

U.S. PATENT DOCUMENTS 8,186,948 B2 * 5/2012 Kabatzke ............... F03D 7/047
416/1
9,528,493 B2 * 12/2016 Asheim ................ F03D 7/0256
(Continued)

FOREIGN PATENT DOCUMENTS

CN    104792294 A    7/2015
EP     1811172 A1    7/2007
(Continued)

OTHER PUBLICATIONS

Nielsen Torben: "Tracking of Blade Disturbance by Adaptive Filtering ans Optimizing Weighting of Wind Measurements"; Siemens AG; 2016.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A wind data detecting system for a wind turbine, the wind turbine including a nacelle and a rotor comprising a plurality of rotor blades separated by a predetermined angle within a rotor plane is provided. The system includes (a) a first wind sensor for providing first wind data (b) a second wind sensor for providing second wind data, (c) a support structure adapted to be mounted on the nacelle of the wind turbine and to support the first wind sensor and the second wind sensor at respective first and second positions, and (d) a processing unit for generating output wind data based on the first wind data and the second wind data wherein the processing unit
(Continued)

Figure 1:
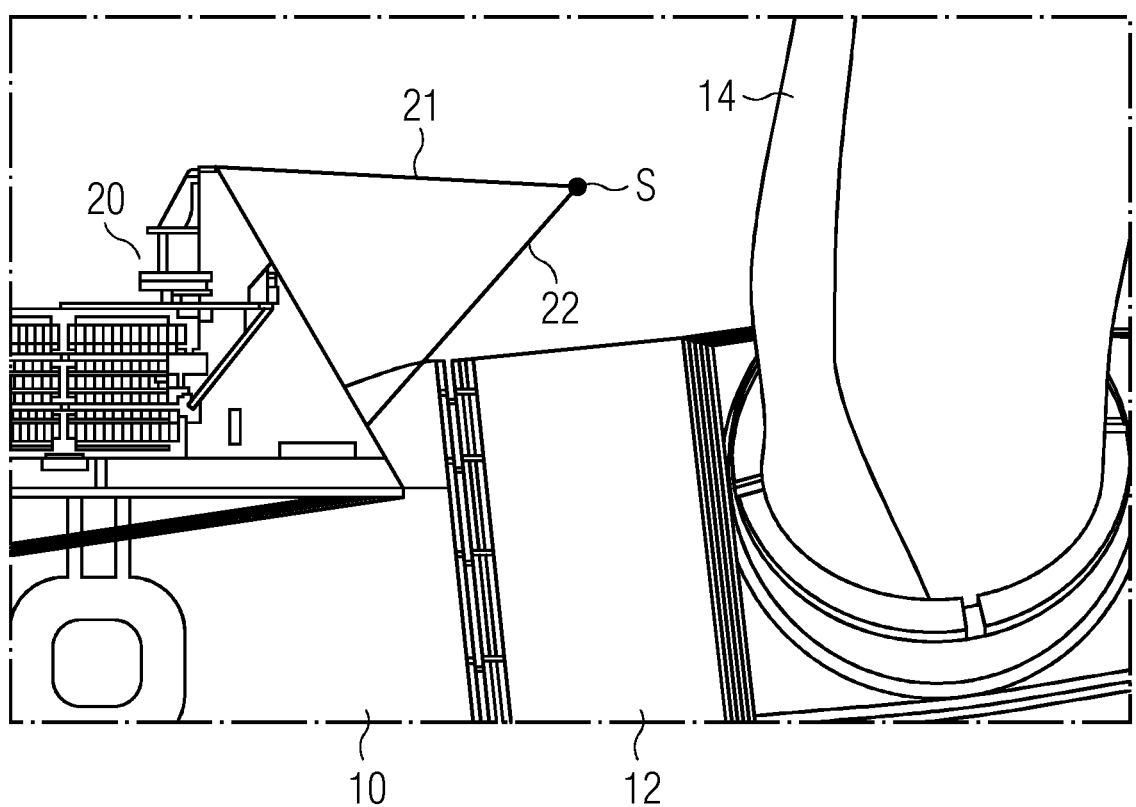

is adapted to generate first filtered wind data and second filtered wind data by applying an adaptive filtering algorithm to the first wind data and the second wind data.

19 Claims, 2 Drawing Sheets

(51) Int. Cl.
F03D 17/00 (2016.01)
F03D 7/02 (2006.01)
F03D 7/04 (2006.01)

(52) U.S. Cl.
CPC ..... F05B 2270/32 (2013.01); F05B 2270/321 (2013.01); F05B 2270/329 (2013.01)

(56) References Cited

U.S. PATENT DOCUMENTS

2012/0318057 A1 12/2012 Olesen
2015/0204208 A1 7/2015 Bertolotti et al.

FOREIGN PATENT DOCUMENTS

| EP | 2213873 A1 | 8/2010 |
| EP | 2515122 A1 | 10/2012 |
| GB | 2515578 A | 12/2014 |
| WO | 2011095170 A1 | 8/2011 |

OTHER PUBLICATIONS

PCT International Search Report and Written Opinion for PCT/EP2017/072952 filed Sep. 13, 2017.

* cited by examiner

WIND DATA DETECTING SYSTEM AND METHOD FOR WIND TURBINES

CROSS-REFERENCE TO RELATED APPLICATIONS

This application claims priority to PCT Application No. PCT/EP2017/072951, having a filing date of Sep. 13, 2017, which is based on German Application No. 10 2016 220 640.0, having a filing date of Oct. 20, 2016, the entire contents both of which are hereby incorporated by reference.

FIELD OF TECHNOLOGY

The following relates to the field of wind turbines, in particular the following relates to a wind data detecting system for a wind turbine, the wind turbine comprising a nacelle and a rotor comprising a plurality of rotor blades separated by a predetermined angle within a rotor plane. The following further relates to a wind turbine, a wind farm, a method, and a computer program.

BACKGROUND

Wind data, such as wind speed and wind direction, are important parameters for operating a wind turbine. The wind speed is e.g. used to set the load and/or blade angle (pitch) for a wind turbine during operation and the wind direction is used to adjust the direction of the wind turbine relative to the wind (yaw angle).

Traditionally, wind data is obtained by means of a wind sensor unit arranged on top of the nacelle as far away from the rotor as possible (i.e. at the rear end of the nacelle) in order to minimize measurement disturbance caused by the rotating rotor blades. To further minimize the measurement disturbance, a filtering of the measurement data may be applied as described in EP 2 515 122 A1.

However, recent research has revealed that the vortices from the rotor blades, in particular from the root segments of the rotor blades, get wider and wider with increasing downstream distance from the rotor. Thus, the wind reaching the wind sensor unit arranged at the rear upper part of the nacelle is in fact turbulent and not undisturbed by the rotor blades at any time, such that even the above-mentioned filtering of the measurement data cannot remove the blade disturbance.

In view of this, a concept has been developed where the wind sensor unit is located closer to the rotor and where the part of the sensor signal which is disturbed by passing blades is filtered out. Such a filtering algorithm is described by Torben Nielsen in "Tracking of Blade Disturbance by Adaptive Filtering and Optimized Weighting of Wind Measurements" (available at http://dx.doi.org/10.18169/PAPDEOTT004946). However, the filtered sensor data obtained with this concept contains gaps (corresponding to the time intervals where a passing blade disturbs the measurement) such that sudden wind changes may not be detected.

Accordingly, there may be a need for a way of obtaining an accurate and in particular continuous stream of reliable wind data.

SUMMARY

According to a first aspect of embodiments of the invention, there is provided a wind data detecting system for a wind turbine, the wind turbine comprising a nacelle and a rotor comprising a plurality of rotor blades separated by a predetermined angle within a rotor plane. The system comprises (a) a first wind sensor (S1) for providing first wind data, (b) a second wind sensor (S2) for providing second wind data, (c) a support structure adapted to be mounted on the nacelle of the wind turbine and to support the first wind sensor and the second wind sensor at respective first and second positions, and (d) a processing unit for generating output wind data based on the first wind data and the second wind data, wherein the processing unit is adapted to generate first filtered wind data and second filtered wind data by applying an adaptive filtering algorithm to the first wind data and the second wind data, respectively, and wherein the processing unit is adapted to generate the output wind data by combining the first filtered wind data and the second filtered wind data.

This aspect of embodiments of the invention is based on the idea that an arrangement of two (first and second) wind sensors at respective individual positions provides two individual sets of wind data which (due to the different sensor positions) are differently influenced by the passing rotor blades, in particular they are not influenced by a passing blade at the same time. By applying an adaptive filtering algorithm to each set of wind data, the resulting sets of filtered wind data are therefore not identical. By combining the two sets of filtered wind data, the resulting output wind data will therefore contain more information than either of the two sets of filtered data on their own. This is because the filtering influences different parts of the two sets of wind data as these are not (simultaneously) influenced by the rotor blades in the same way.

According to embodiments of the invention, the adaptive filtering algorithm is adapted to identify and remove sections of wind data subjected to rotor blade disturbances.

The adaptive filtering algorithm may in particular be the one described by Torben Nielsen in "Tracking of Blade Disturbance by Adaptive Filtering and Optimized Weighting of Wind Measurements" (available at http://dx.doi.org/10.18169/PAPDEOTT004946).

As a result of the filtering algorithm, the first/second filtered wind data essentially differs from the first/second wind data (i.e. the raw wind data from the first/second sensor) in that the sections or parts (corresponding to particular time intervals) of the first/second wind data which are influenced by a passing blade (and thus not reliable) are set to zero in the first/second filtered wind data while the remaining (i.e. reliable) data is maintained. In other words, the first and second filtered wind data contains gaps (time intervals with zero values). However, due to the different positions of the first and second sensors, the gaps do not occur at the same time in the first filtered wind data and the second wind data. Accordingly, at any given point in time, at least one of the first and second filtered wind data will contain reliable wind data (i.e. non-zero values).

According to further embodiments of the invention, the first position and the second position are located within a plane substantially parallel to the rotor plane.

In other words, the first and second wind sensors are positioned such that the distance from the first position equals the distance from the second position to the rotor plane.

According to further embodiments of the invention, the first position and the second position are separated by a sensor angle, the sensor angle being different from the predetermined angle (separating the rotor blades).

By separating the first and second positions by an angle (sensor angle) that is different from the predetermined angle between the rotor blades (i.e. between two neighboring rotor blades), it is assured that whenever one of the first and second wind sensors is influenced by (in particular covered by) a rotor blade, the other one of the first and second wind sensors is not at the same time influenced by (in particular covered by) a rotor blade.

According to further embodiments of the invention, the sensor angle is about half the predetermined angle.

A sensor angle equaling (approximately) half of the predetermined blade angle provides an effective separation of the wind sensors such that both sensors cannot simultaneously be influenced by the same rotor blade or by two different rotor blades. Thereby, it is assured that reliable and useful output wind data can be obtained by combining the two filtered wind data signals.

In case of, for example, three rotor blades separated by 120°, the sensor angle will be around 60°, such as between 50° and 70°.

According to further embodiments of the invention, the output wind data provides a continuous series of wind data values over time.

In other words, the output wind data does not contain any gaps, as opposed to each of the first filtered wind data and the second filtered wind data.

According to further embodiments of the invention, the output wind data comprises wind data values representative of wind speed and/or wind direction.

According to further embodiments of the invention, combining the first filtered wind data and the second filtered wind data (in order to generate the output wind data) comprises switching between the first filtered data and the second filtered data.

In other words, at any point in time, the output wind data includes either the first filtered wind data or the second filtered wind data.

The switching may take place when a gap is detected in the filtered wind data currently forming the output wind data. In other words, when e.g. the first filtered wind data delivers the output wind data, a switch to the second filtered wind data will be performed when a gap is detected in the first filtered wind data, and vice versa.

To assure a continuous stream of output wind data, the switching may be performed a predetermined number of samples prior to the beginning of the gap.

According to further embodiments of the invention, combining the first filtered wind data and the second filtered wind data comprises calculating a weighted sum of the first filtered wind data and the second filtered wind data.

By calculating a weighted sum, both the first filtered wind data and the second filtered wind data may contribute to the output wind data at the same time, however with a weighting reflecting the respective data's reliability.

According to further embodiments of the invention, the processing unit is adapted to calculate the weighted sum by applying a first variable weight to the first filtered wind data and a second variable weight to the second filtered wind data.

In other words, the weights applied to the first and second filtered wind data are variable, i.e. the first variable weight and the second variable weight take on different values at different points in time in order to reflect the instant reliability of the filtered wind data. At any given time, the sum of the first variable weight and the second variable weight should equal 1.

According to further embodiments of the invention, the processing unit is adapted to determine the first variable weight and the second variable weight based respectively on the first filtered wind data and the second filtered wind data, in particular based on the occurrence of gaps in the first filtered wind data and the second filtered wind data.

The first/second variable weight may e.g. be determined in accordance with a distance (in time) to the gaps in the first/second filtered wind data, such that the first/second variable is assigned a zero value within the gaps, a relatively low value (e.g. between 0 and 0.5) just before and just after a gap, and a larger value (e.g. between 0.5 and 1) in between gaps.

According to a second aspect of embodiments of the invention, there is provided a wind turbine. The wind turbine comprises (a) a nacelle, (b) a rotor comprising a plurality of rotor blades separated by a predetermined angle within a rotor plane, and (c) a wind data detecting system according to the first aspect or any of the above embodiments, wherein the support structure of the wind data detecting system is mounted on the nacelle.

This aspect of embodiments of the invention is essentially based on the same idea as the first aspect. More specifically, the second aspect relates to a wind turbine equipped with a highly reliably and precise wind data detecting system capable of providing continuous wind data that is useful in controlling the wind turbine.

According to a third aspect of embodiments of the invention, there is provided a wind farm comprising a plurality of wind turbines according to the second aspect.

According to a fourth aspect of embodiments of the invention, there is provided a method of detecting wind data for a wind turbine, the wind turbine comprising a nacelle and a rotor comprising a plurality of rotor blades separated by a predetermined angle within a rotor plane. The method comprises (a) obtaining first wind data from a first wind sensor located at a first position, (b) obtaining second wind data from a second wind sensor located at a second position, and (c) generating output wind data based on the first wind data and the second wind data by (i) generating first filtered wind data by applying an adaptive filtering algorithm to the first wind data, (ii) generating second filtered wind data by applying the adaptive filtering algorithm to the second wind data, and (iii) combining the first filtered wind data and the second filtered wind data.

According to a fifth aspect of embodiments of the invention, there is provided a comprising computer executable instructions, which, when run on a computer, causes the computer to perform the method according to the fourth aspect.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. The embodiments will be described in more detail hereinafter with reference to examples of embodiments.

However, it is explicitly noted that embodiments of the invention are not limited to the described exemplary embodiments.

BRIEF DESCRIPTION

Figure 2:
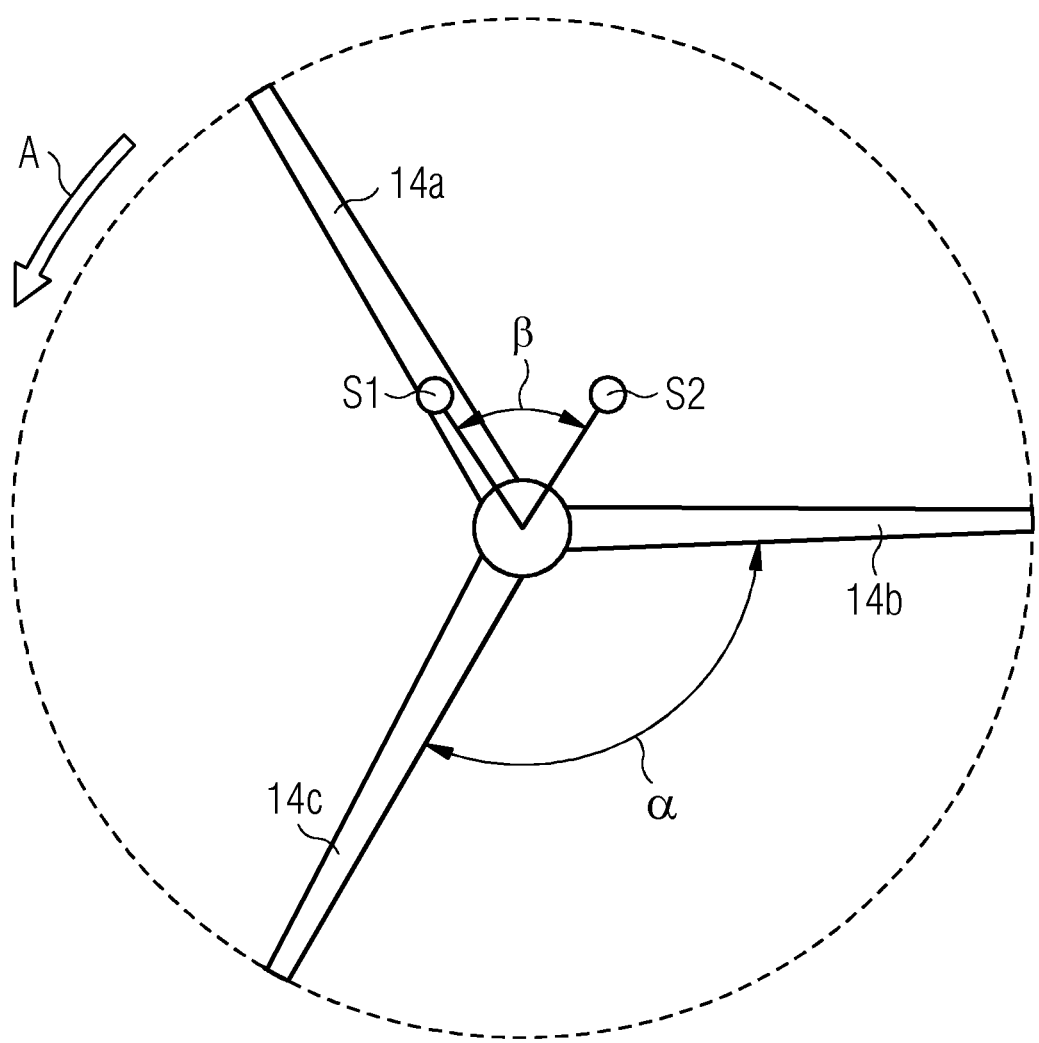

Some of the embodiments will be described in detail, with references to the following Figures, wherein like designations denote like members, wherein:

FIG. 1 shows a wind turbine with a wind data detecting system comprising a single wind sensor; and FIG. 2 shows a front view of a wind turbine with a wind data detecting system according to an embodiment of embodiments of the present invention.

DETAILED DESCRIPTION

The illustration in the drawing is schematic. It is noted that in different figures, similar or identical elements are provided with the same reference numerals or with reference numerals which differ only within the first digit.

FIG. 1 shows a wind turbine with a wind data detecting system comprising a single wind sensor S. The wind turbine is a direct drive wind turbine and comprises a nacelle 10, a generator 12 and a rotor comprising rotor blades 14. The wind sensor S is mounted by means of a support structure comprising beams 21 and 22. The beam 21 is mounted to a part of a frame 20 of a cooling unit located on and/or in the nacelle 10. The beam 21 extends in a substantially horizontal direction towards the rotor. The beam 22 is fastened to the nacelle 10 and extends in a tilted direction towards the rotor. The wind sensor S is located at the intersection of the beams 21 and 22 and is thereby held in a position above the generator 12 and close to the rotor. At an appropriate location, e.g. within the nacelle, the wind data detecting system further comprises a processing unit (not shown) for handling the data (such as wind direction and wind speed samples) provided by the wind sensor S. In particular, the processing unit is adapted to apply the adaptive filtering algorithm described by Torben Nielsen in "Tracking of Blade Disturbance by Adaptive Filtering and Optimized Weighting of Wind Measurements" (available at http://dx.doi.org/10.18169/PAPDEOTT004946). The resulting output data contains reliable data values separated by gaps (containing zero values or blanks) where the data are strongly influenced by a passing rotor blade 14.

FIG. 2 shows a front view of a wind turbine with a wind data detecting system according to an embodiment of embodiments of the present invention. More specifically, the wind turbine as such may be similar to the wind turbine shown in FIG. 1, although the nacelle 10, generator 12, and frame 20 are not visible in FIG. 2. As shown, the rotor of the wind turbine comprises three rotor blades 14a, 14b, 14c separated by an angle α of 120°. During operation, the rotor blades 14a, 14b, 14c rotate as indicated by arrow A within a plane (rotor plane) spanned by the rotor blades 14a, 14b, 14c. The wind data detecting system comprises two wind sensors, i.e. a first wind sensor S1 and a second wind sensor S2. The wind sensors S1, S2 are held in position closely behind the rotor by a support structure (not shown in detail) fastened to the nacelle 10. The support structure may contain a number of beams (similar to beams 21, 22 in FIG. 1) and is designed to hold the wind sensors S1, S2 in positions within a plane essentially parallel to the rotor plane and such that the wind sensors S1, S2 are separated by an angle (sensor angle) 13 approximately equal to α/2, i.e. β=60°. Thereby, as shown in FIG. 2, when the first wind sensor S1 is disturbed by the rotor blade 14a, the second wind sensor S2 is located with a maximum distance to both rotor blade 14a and rotor blade 14b and is therefore not disturbed by the rotor blades 14, 14b. In general, it can be seen that, at any given time, at least one of the wind sensors S1, S2 will be able to provide wind data that is not disturbed by any of the rotor blades 14a, 14b, 14c. Furthermore, there may even be time intervals where both wind sensors S1, S2 are capable of providing undisturbed wind data.

The arrangement shown in FIG. 2 is utilized by the processing unit (not shown) which applies the adaptive filtering algorithm individually to first wind data provided by the first wind sensor S1 and to second wind data provided by the second wind sensor S2. Thereby, the processing unit obtains first filtered wind data and second filtered wind data. These first and second filtered wind data are then combined by the processing unit in order to produce continuous output wind data, i.e. without gaps caused by filtering out blade disturbances. In other words, it is utilized that, at any given time, at least one of the wind sensors S1, S2 is not disturbed by a rotating rotor blade 14a, 14b, 14c, such that the corresponding filtered wind data will contain reliable values and no gap. Thus, by combining the filtered wind data, reliable wind data are provided for any point in time.

The processing unit may be adapted to combine the first and second filtered wind data in various ways, for example by simply switching back and forth between the first and second filtered wind data or by calculating a weighted sum of the first and second filtered wind data. In the first case (switching back and forth), the processing unit switches to the other set of filtered wind data as soon as a gap is detected in the currently used set of filtered data. In the other case (weighted sum), the processing unit applies variable weights to the first and second filtered wind data in dependency of how reliable each set of filtered data is considered to be, e.g. in dependency on the instant distance to the respective gaps in the first and second filtered wind data. By calculating a weighted sum with variable weights, an increased precision and robustness in the reliable data may be obtained due to the averaging.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A wind data detecting system for a wind turbine, the wind data detecting system comprising:
    a first wind sensor for providing first wind data,
    a second wind sensor for providing second wind data,
    a support structure adapted to be mounted on the nacelle of the wind turbine and to support the first wind sensor and the second wind sensor at respective first and second positions, wherein the first position and the second position are separated by a sensor angle (β) between 50 degrees and 70 degrees determined relative to an axis of rotation of a plurality of rotor blades, and
    a processing unit for generating output wind data based on the first wind data and the second wind data,
    wherein the processing unit is adapted to generate first filtered wind data and second filtered wind data by applying an adaptive filtering algorithm to the first wind data and the second wind data, respectively, and wherein the processing unit is adapted to generate the output wind data by combining the first filtered wind data and the second filtered wind data.

2. The system according to claim 1, wherein the adaptive filtering algorithm is adapted to identify and remove sections of wind data subjected to rotor blade disturbances.

3. The system according to claim 1, wherein the first position and the second position are located within a plane substantially parallel to the rotor plane.

4. The system according to claim 3, wherein the sensor angle ($\beta$), is different from a predetermined angle ($\alpha$) separating the plurality of rotor blades within a rotor plane.

5. The system according to claim 4, wherein the predetermined angle ($\alpha$) is 120 degrees and the sensor angle ($\beta$) is half the predetermined angle ($\alpha$).

6. The system according to claim 1, wherein the output wind data provides a continuous series of wind data values over time.

7. The system according to claim 1, wherein the output wind data comprises wind data values representative of at least one of wind speed and wind direction.

8. The system according to claim 1, wherein combining the first filtered wind data and the second filtered wind data comprises switching between the first filtered data and the second filtered data.

9. The system according to claim 1, wherein combining the first filtered wind data and the second filtered wind data comprises calculating a weighted sum of the first filtered wind data and the second filtered wind data.

10. The system according to claim 9, wherein the processing unit is adapted to calculate the weighted sum by applying a first variable weight to the first filtered wind data and a second variable weight to the second filtered wind data.

11. The system according to claim 10, wherein the processing unit is adapted to determine the first variable weight and the second variable weight based respectively on the first filtered wind data and the second filtered wind data.

12. A wind turbine comprising:
a nacelle,
a rotor comprising a plurality of rotor blades separated by a predetermined angle within a rotor plane, and
a wind data detecting system, the wind data detecting system comprising:
a first wind sensor for providing first wind data,
a second wind sensor for providing second wind data,
a support structure mounted on the nacelle of the wind turbine and supporting the first wind sensor and the second wind sensor at respective first and second positions, wherein the first position and the second position are separated by a sensor angle ($\beta$) between 50 degrees and 70 degrees determined relative to an axis of rotation of the plurality of rotor blades, and
a processing unit for generating output wind data based on the first wind data and the second wind data, wherein the processing unit is adapted to generate first filtered wind data and second filtered wind data by applying an adaptive filtering algorithm to the first wind data and the second wind data, respectively, and wherein the processing unit is adapted to generate the output wind data by combining the first filtered wind data and the second filtered wind data.

13. A wind farm comprising a plurality of wind turbines according to claim 12.

14. A method of detecting wind data for a wind turbine, the wind turbine comprising a nacelle and a rotor comprising a plurality of rotor blades separated by a predetermined angle within a rotor plane, the method comprising
obtaining first wind data from a first wind sensor located at a first position,
obtaining second wind data from a second wind sensor located at a second position, wherein the first position and the second position are separated by a sensor angle ($\beta$) between 50 degrees and 70 degrees determined relative to an axis of rotation of a plurality of rotor blades, and
generating output wind data based on the first wind data and the second wind data by (i) generating first filtered wind data by applying an adaptive filtering algorithm to the first wind data, (ii) generating second filtered wind data by applying the adaptive filtering algorithm to the second wind data, and (iii) combining the first filtered wind data and the second filtered wind data.

15. A computer program product comprising a computer readable storage device storing computer executable instructions, which, when run on a computer, causes the computer to perform a method of detecting wind data for a wind turbine, the wind turbine comprising a nacelle and a rotor comprising a plurality of rotor blades separated by a predetermined angle within a rotor plane, the method comprising:
obtaining first wind data from a first wind sensor located at a first position,
obtaining second wind data from a second wind sensor located at a second position, wherein the first position and the second position are separated by a sensor angle ($\beta$) between 50 degrees and 70 degrees determined relative to an axis of rotation of a plurality of rotor blades, and
generating output wind data based on the first wind data and the second wind data by (i) generating first filtered wind data by applying an adaptive filtering algorithm to the first wind data, (ii) generating second filtered wind data by applying the adaptive filtering algorithm to the second wind data, and (iii) combining the first filtered wind data and the second filtered wind data.

16. The wind turbine according to claim 12, wherein the support structure extends from a mounting location on the nacelle toward the rotor such that the first position and the second position are both located between the mounting location and the rotor.

17. The method according to claim 14, wherein the first wind sensor and the second wind sensor are both mounted on a support structure that extends from a mounting location on the nacelle toward the rotor.

18. The computer program product according to claim 15, wherein the first wind sensor and the second wind sensor are both mounted on a support structure that extends from a mounting location on the nacelle toward the rotor.

19. The wind data detecting system according to claim 1, wherein the support structure extends from a mounting location on the nacelle toward the rotor such that the first position and the second position are both located between the mounting location and the rotor.

* * * * *